Feb. 24, 1942.   W. L. CHESTERMAN   2,274,319
HATCH CONSTRUCTION
Filed Dec. 3, 1938
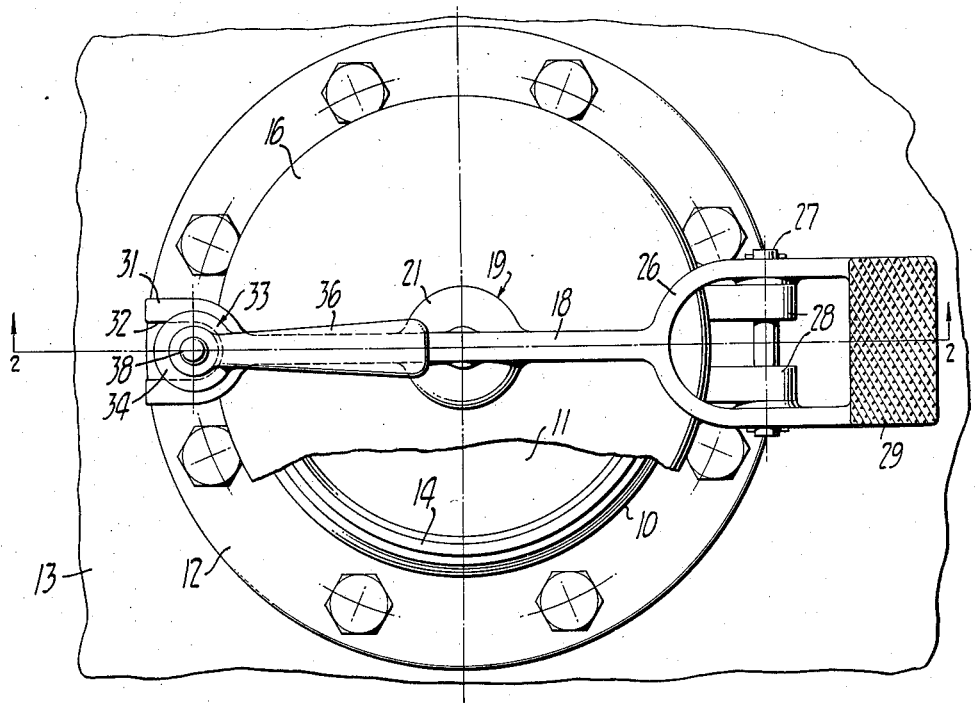
FIG_1_
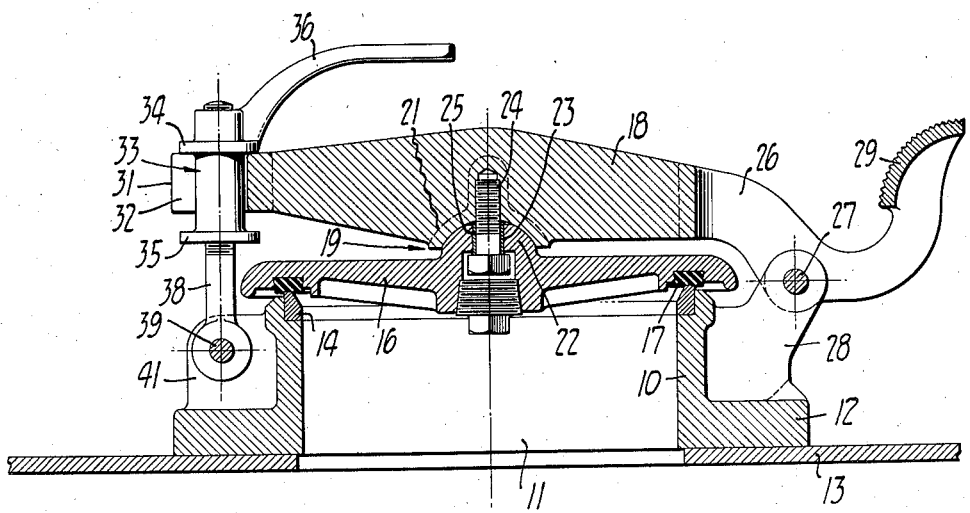
FIG_2_
INVENTOR.
Walter L. Chesterman
BY
ATTORNEY Patented Feb. 24, 1942

2,274,319

UNITED STATES PATENT OFFICE 2,274,319

HATCH CONSTRUCTION

Walter L. Chesterman, Berkeley, Calif., assignor to Albert E. Jurs, Berkeley, Calif., doing business as Shand & Jurs Company Application December 3, 1938, Serial No. 243,800

2 Claims. (Cl. 220—57)

This invention relates generally to hatch constructions such as are applicable to tanks or like structures.

It is an object of the invention to provide a hatch construction which affords a positive seal at all times, without rapid deterioration of the seating surfaces. A feature of the invention contributing to this result is the use of a novel type of connection to the central portion of the closure disc, whereby clamping pressure is uniformly distributed over the seating surfaces.

A further object of the invention is to afford a device of the above character having novel means for jacking the closure disc open, in the event it tends to hold fast to the stationary seat.

Further objects of the invention will appear from the following description in which the preferred embodiment of the invention has been set forth in detail in conjunction with the accompanying drawing.

Referring to the drawing:

Fig. 1 is a plan view illustrating a hatch construction incorporating the present invention, with a portion of the closure disc being broken away.

Fig. 2 is a side elevational view in cross-section of the hatch construction illustrated in Fig. 1.

The device as illustrated in the drawing consists of a body 10, provided with the central hatch opening 11. A bottom flange 12 facilitates attachment of the body to the upper wall 13 of a tank. The upper part of the body carries an annular seat ring 14, which can be formed of suitable metal and which has a pressed fit or is otherwise attached and sealed with respect to the body 10.

Extending over the body there is a closure disc 16, which carries an insert ring 17 for cooperating with the seat ring 14. The insert ring 17 can be formed of suitable material such as a synthetic rubber, capable of some resilient deformation to facilitate good sealing engagement with the upper surface of seat ring 14. Extending across the closure disc 16 there is a lever 18, which is attached to the central portion of the closure disc 16 by means of a ball and socket joint 19. This joint makes use of a spherical shaped socket 21, formed on lever 18, and a spherical shaped ball 22, formed on the closure disc 16. It will be noted that the common center of the spherical surfaces in contact between the ball and socket, lies generally within the plane of the closure disc 16. There is an opening 23 in the ball 22, serving to loosely accommodate the retaining stud 24. The closure disc is sealed against leakage through opening 23 by the plug 20. A sleeve 25 is shown surrounding the stud whereby the stud can be tightened against this sleeve, without clamping the spherical surfaces together. There is likewise substantial clearance about sleeve 25, whereby when the closure disc is in open position it is free to tilt in any direction through a substantial angle with respect to the lever 18.

To form a pivotal connection between lever 18 and one side portion of the body 10, the lever has a forked portion 26, connected to the pivotal pin 27. Pin 27 is in turn carried by the spaced tabs 28 formed upon the body 10. The forked portion 26 is also extended to form the foot lever 29, for manual operation.

To enable application of either jacking or clamping forces to the lever 18, I provide means including a single member which can be rotated in one direction to apply clamping force, and in an opposite direction to apply jacking force. Thus the other end of lever 18 is provided with a fork 31, and the slot 32 afforded by this fork is adapted to accommodate the nut 33. This nut is provided with spaced upper and lower collars 34 and 35, and is also provided with the operating handle 36. There is a threaded engagement between nut 33 and a rod 38. The lower end of this rod is attached to the pivot pin 39 which in turn is carried by the spaced tabs 14 formed on the body 10. When nut 36 is turned in a clockwise direction, collar 34 forces lever 18 downwardly to tightly clamp the closure disc 16 upon the body. By turning nut 33 in a counter-clockwise direction, collar 34 can be disengaged with respect to the lever, and the nut and the rod 38 swung to an out-of-the-way position. Should one desire to jack the lever 18 upwardly, the nut 33 is permitted to remain within slot 32, while the operator continues counter-clockwise rotation to bring collar 35 into jacking engagement with the lower side of the lever.

Operation of the device described above can be reviewed as follows: Figs. 1 and 2 of the drawing illustrate the closure disc 16 when closed upon the body, with a seal being established between the seat ring 14 and the insert ring 17. The outward pressure exerted by lever 18 is evenly applied to the center of the closure disc 16, by virtue of the ball and socket joint 19. Therefore there is a uniform distribution of pressure throughout the circumference of the seating surfaces. To move the disc 16 to open position, one loosens the nut 33 by turning handle 36, after which the nut is swung to an out-of-the-way position. The operator then applies pressure to foot lever 29 to swing the lever 18 together with the closure disc, to an upright position. In order to close the opening 11 the operator releases pressure from the foot lever 29, thus permitting the lever 18 together with the closure disc 16 to swing back to closed position. As the closure disc engages the seat ring 14 it immediately assumes a position in which the insert ring 17 rests flat upon the seat ring 14. Nut 33 is then engaged with the lever 18 and tightened to clamp the closure disc upon the body. Such clamping pressure, as previously pointed out, is evenly applied throughout the circumference of the seating surfaces, thereby insuring a positive seal and avoiding injury to the seating surfaces, such as invariably results from unequal distribution of pressure. As previously explained should one desire to jack the closure disc from its seat, this can be done by turning nut 33 in a counter-clockwise direction, whereby collar 35 engages the lower side of lever 18 to force this lever upwardly.

In the foregoing description reference has been made to the fact that the common center of the spherical surfaces provided by the socket 21 and ball 22, is located within the general plane of the closure disc. This means that the closure disc may adjust itself relative to the lever 18 to insure proper alignment with respect to the seat ring 14, with a minimum amount of lateral movement occurring between the closure disc and the body. Such lateral movement is to be avoided because it generally involves a lateral stressing of the seating surfaces, when clamping pressure is applied.

My device has been found particularly valuable as a hatch construction for use with tanks or reservoirs containing volatile petroleum products. In such instances it is essential to secure a positive seal, and at the same time frequent opening of the hatch may be necessary for the purpose of taking samples, making temperature measurements, etc.

I claim:

1. In a hatch construction for application to the wall of a tank, an annular seat on said wall, a closure disc cooperating with said seat to close said opening, a lever extending across the outer side of the closure disc, means forming a pivotal mounting for said lever on said wall, a ball portion projecting outwardly from said disc, a socket portion formed in said lever to provide a ball and socket joint between said lever and said disc with its spherical surfaces formed on a center located substantially within the plane of said disc, means for loosely connecting said lever and said disc adjacent the central portion of said ball and socket joint, including a stud threaded in said socket portion and having its head disposed within said ball portion, the interior of said ball portion being sealed against communication with the interior of said tank, and means carried by said wall at a location diametrically opposite from said pivotal mounting for releasably applying both clamping and jacking forces to said lever.

2. In a hatch construction for application to the wall of a tank, an annular seat on said wall, a closure disc cooperating with said seat to close said opening, a lever extending across the outer side of the closure disc, means forming a pivotal mounting for said lever on said wall, a ball portion projecting outwardly from said disc, a socket portion formed in said lever to provide a ball and socket joint between said lever and said disc with its spherical surfaces formed on a center located substantially within the plane of said disc, means for loosely connecting said lever and said disc adjacent the central portion of said ball and socket joint including a stud threaded in said socket portion and having its head disposed within said ball portion, the interior of said ball portion being sealed against communication with the interior of said tank, and means carried by said wall at a location diametrically opposite from said pivotal mounting for releasably applying both clamping and jacking forces to said lever; said clamping and jacking means including a threaded member, and a nut threaded upon said member, said nut being provided with two spaced collars for engagement with opposed surfaces of said lever.

WALTER L. CHESTERMAN.